United States Patent Office 3,258,064
Patented June 28, 1966

3,258,064
PRODUCTION OF TITANIUM TETRACHLORIDE
Thomas T. Gniewek, Jr., Pittsburg, and Earl O. Kleinfelder, Antioch, Calif., assignors to E. I. du Pont de Nemours and Company, a corporation of Delaware
No Drawing. Filed Apr. 9, 1964, Ser. No. 358,608
5 Claims. (Cl. 165—1)

This invention relates to the production of titanium tetrachloride and to the separation and recovery of that product from its gaseous mixtures with other metal chlorides. More particularly, it relates to novel methods and means for maintaining the heat transfer surfaces of equipment with which liquid slurries containing the chlorides of both iron and titanium come in contact during such separation and recovery substantially free from objectionable solid chloride deposition.

Titanium tetrachloride is a well-known commodity of commerce which is a useful intermediate in manufacturing titanium dioxide pigments, titanium metal and other products. It can be obtained by chlorinating a finely divided mixture made up of a titanium-bearing mineral, such as ilmenite or rutile, or other titanium oxide-containing material, and from, say, 15–35% by weight of a solid, carbonaceous reducing agent, such as carbon or coke. In such chlorination the ore-reducing agent mixture and chlorine is charged into a suitable reaction vessel and at such a rate that sufficient heat evolves to maintain a reaction temperature above 600° C. and preferably from 850° C. to 1250° C. In a continuous type operation, the titaniferous ore and coke, in finely divided state, is fed into the reaction chamber while pure chlorine, or chlorine in admixture with air, is simultaneously fed into the bottom of said chamber to cause maintenance of the unreacted solids in intimate contact with the gas and their suspension in the upwardly flowing gas stream to provide a fluidized or bubbling bed type of operation. The gaseous reaction products, containing the chlorides of titanium and iron, are removed from the reactor and are then cooled and condensed in a separate ssytem to recover the $TiCl_4$. Such U.S. patents as Nos. 2,184,887; 2,701,179; 2,701,180; and 2,718,279 exemplify known prior art ore chlorination and $TiCl_4$ recovery systems.

The contaminated metal chlorides produced in the chlorination of titaniferous ores contain ferrous chloride, ferric chlorides and aluminum chloride together with oxychlorides of vanadium and chlorides of silicon, zirconium, tin, niobium, and manganese. Iron and vanadium are both injurious to titanium dioxide pigment and titanium metal products. However, only the iron contaminant in the form of ferrous and ferric chlorides presents difficulty in condensing titanium tetrachloride and gases containing these materials. The greatest difficulty encountered in hot chlorination gases from titaniferous materials containing iron is the prevention of fractional condensation of solid iron chlorides upon the surfaces of the heat exchange equipment used. This condensation takes place on the side walls and heat exchange surfaces and is particularly injurious to heat transfer. In time it accumulates to form significant deposits of ferrous or ferric chloride which impair the efficiency of the equipment or plug it to such an extent that the condenser is rendered essentially inoperable. Various efforts at circumventing these problems have been proposed. Thus, the gaseous mixture is first cooled to above the dew point of the ferric chloride in a water-cooled flue cooler, and as contemplated in, for example, U.S. Patents 2,668,424; 2,675,890; 2,675,891 and 2,675,889. Once the hot chlorination gases are cooled to a temperature just above the dew point of ferrous chloride and ferric chloride, it is necessary that the vapors be condensed in such a manner that ferric chlorides will not stick to and blind the condenser heat transfer surfaces. This can be effected by spray condensing the iron chloride-containing gases by contacting them with cold liquid titanium tetrachloride and in accordance with the procedures contemplated in U.S. Patents 2,446,181; 2,870,869; and 2,718,279. In the first two of these patents, droplets of cold titanium tetrachloride are sprayed through the hot gaseous mixture within the condenser, while in the last mentioned patent a falling film of cold liquid titanium tetrachloride is caused to flow down the interior walls of the condenser to provide a washing fluid for such walls and to isolate and maintain the hot gases out of direct contact therewith.

In treating hot titanium tetrachloride-containing gaseous mixtures to bring them from the chlorination temperature to room temperature, it usually becomes necessary to cool them in the form of a liquid titanium tetrachloride slurry containing ferrous and ferric chlorides and to recirculate the cooled liquid product to the condensation systems above referred to. While the use of iron chloride-$TiCl_4$ slurries is not essential for such purpose, their employment is advantageous because it eliminates the need for recontaminating a pure titanium tetrachloride liquid with iron-containing gases. In conducting an iron chloride-titanium tetrachloride liquid through a heat exchange apparatus, the same difficulties and problems arise as are encountered in the handling and cooling of vaporous iron chloride-titanium tetrachloride mixtures. That is, miscellaneous metal chlorides (mostly ferric chloride) disadvantageously adhere to the heat transfer surfaces of the equipment and foul the condenser to such an extent that it is rendered substantially inoperable, i.e. heat transfer efficiency decreases and pressure drop becomes objectionably excessive.

It is among the objects of this invention to overcome these and other disadvantages which have characterized prior iron chloride-containing titanium tetrachloride liquid handling and processing in $TiCl_4$ recovery and purification operations as well as to provide novel and effective methods and means for attaining these objects. It is among the further objects of this invention to provide a novel method for maintaining the internal heat transfer surfaces of a heat exchange apparatus relatively clean and free of objectionable impurity deposition when liquid titanium tetrachloride containing impurities such as ferric chloride and other miscellaneous contaminants plus any blowover fines of unreacted ore materials is subjected to cooling or heating treatment in such apparatus from ambient temperature to the boiling point of the liquid slurry at atmospheric or sub-atmospheric pressures. An additional object is to provide a novel method for stabilizing the heat transfer co-efficient through an apparatus employed for effecting changes of enthalpy in titanium tetrachloride-ferric chloride slurries. Other objects and advantages of the invention will be apparent from the ensuing description.

These and other objects are attained in this invention which embodies the discovery that solid chloride deposition on the internal walls or heat transfer surfaces of equipment employed in treating iron or other solid chloride-containing liquid titanium tetrachloride slurries can be avoided and impairment of equipment heat transfer efficiency prevented by maintaining certain critical slurry flow rates during the treatment or passage of the slurry through the equipment.

In accordance with this invention, a liquid titanium tetrachloride slurry containing up to 10% ferric chloride solids and miscellaneous insoluble impurity chlorides, can be cooled in a conventional heat exchanger from the boiling point to desired lower temperatures without objectionable ferric chloride deposition on the heat transfer surfaces of the exchanger by passing said slurry over said surfaces at controlled flow rates, e.g. at a lineal velocity of at least 5 feet per second and up to 60 feet per second, and preferably at speeds ranging from at least 7 or 8 feet per second to 30 feet per second. It has been further found that these results ensue irrespective of whether such slurry heating or cooling is carried under atmospheric pressure or pressures ranging up to 200 pounds per square inch.

The linear velocity required to maintain metallic wall surfaces of heat exchange equipment relatively free of chloride deposits is a little different from that necessary for maintaining ceramic tubing or glass-coated metal surfaces in such condition. Generally, ceramic and glass surfaces on heat exchange contact with $TiCl_4$ slurries tend to foul less rapidly due to the fact that the chlorides stick or adhere less readily to such materials.

Advantageously, this invention effects an enthalpy change in slurries of titanium tetrachloride containing ferric chlorides and other miscellaneous chlorides through solid heat transfer surfaces according to the equation:

$$Q = k_{1\text{lin. vel.}} A \Delta T$$

$Q$ = rate of heat conduction,
$k$ = thermal conductivity at lin. vel.,
$A$ = area,
$\Delta T$ = temp. gradient or difference.

It compises a novel method for preserving the equipment heat transfer surfaces in contact with such slurries. The thermal conductivity for ferrous metals, such as cast iron, nickel, mild steel, stainless steel and Inconel (a nickel-base heat and oxidation resistant alloy containing approximately 13% Cr, 6% Fe and small amounts of Mn, Si, Cu) used in fabricating heat transfer devices, ranging from 0.03 to 0.15 g. calorie per second per square centimeter per degree centigrade per centimeter. Usually these effective thermal conductivities fall off rapidly when one considers the effect of heat transfer, defined as that heat transfer overall of a surface which has been coated with chlorides of iron and miscellaneous chlorides and indigenous metal halides resulting from the recirculation of $TiCl_4$ slurries over said surfaces. For example, in considering the heat transfer, thermal conductivity of a high nickel steel such as Inconel having a thermal conductivity of 0.036 g. calorie per second per square centimeter per degree per centimeter at 25% C., its thermal conductivity value will be decreased to 0.0001 in effect by a coating of ferric chloride on its surfaces after operating at cooling capacity with a linear velocity of 2 feet per second through a heat transfer apparatus. However, when practicing this invention, utilizing the same piece of apparatus and operation, the effective thermal conductivity is preserved and substantially maintained through increase and maintenance of a velocity flow of the slurry through the apparatus at a rate of at least 5 feet per second, as herein contemplated.

The effective thermal conductivity or heat transfer at the surface of particular equipment can be readily determined by comparing the overall heat transfer coefficient with the originally calculated coefficient determined at the clean surface at start-up of any one temperature held at constant linear velocity over the surface of said heat transfer surface. Thus the effect of lineal velocity can be demonstrated by a series of comparative curves wherein effective heat transfer at the surface is presented as a percent of the original heat transfer compared over a period of time ranging up to 60 days. For example, in the instance of mild steel use it can be demonstrated that the preservation of heat transfer surfaces in contact with $TiCl_4$ slurries containing $FeCl_3$ will show that the effect of linear velocity on the fouling of such surfaces after 60 days is 70% when resort is had to a 5 feet per second velocity and a 98% effect when a 7 feet per second velocity is utilized. This is in contrast to a 45% and 15% preservation when velocities of 4 and 2 feet per second, respectively, are resorted to.

It appears that ferric chloride becomes sticky at hot surfaces or cocrystallizes with ferric chloride formations due to the low attack of $TiCl_4$ on iron-containing steels and mild steel. Precipitation on the surface is not sufficient to cause the type of fouling realized over a period of time since the solubility of ferric chloride in $TiCl_4$ at 40° C. is 0.003 wt. percent and at 110° C. for 0.04 percent. The effect of non-sticking to the surface obtained in this invention is primarily due to the turbulence and the degree of turbulence within in the heat exchange tubes which is exerted at the velocities of flow herein contemplated. At relatively low (below 5 feet per second) linear velocities the slurry tends to settle down and adhere to the heat transfer surface and also sticks to the walls of the exchanger. The settling rate of $FeCl_3$ crystals in suspension in $TiCl_4$ liquids obtained from the chlorination of ilmenite and rutile is quite low due to the size of crystals formed from the vapor phase in such short time ranges from about 5 to 15 microns in diameter and smaller. This slow settling rate for ferric and ferrous chloride crystals in $TiCl_4$ slurries makes it particularly difficult to effect separation thereof by normal settling and centrifugal separators. For this reason recycling of slurries with relatively low ferric chloride contents must be undertaken and the present invention provides a highly novel and useful technique for avoiding the difficulties above alluded to in the handling of these slurries.

To a clearer understanding of the invention the following specific examples are given. These are merely illustrative of certain preferred adaptations of the invention and are not to be construed as limiting its underlying scope and principles.

*Example 1*

A mixture consisting of 9 parts of ilmenite ore containing 28% iron oxides and 70% $TiO_2$, and 1 part of coke were chlorinated at about 900° C. in a conventional chlorination furnace by reaction with a chlorine gas containing 85% $Cl_2$ and small percentages of HCl, $CO_2$, $O_2$ and nitrogen. The gas was admitted to the furnace at a rate of 26,000 cu. ft./hr. The gaseous product exiting from the chlorination furnace at substantially the following composition, by volume: $TiCl_4$ 32%, $FeCl_3$ 9%, $CO_2$ 34%, CO 8%, $Cl_2$ 1%, nitrogen 7%, and slight amounts of silicon tetrachloride, HCl, $FeCl_2$ and aluminum trichloride. 6030 lbs./hr. of $TiCl_4$ and 1428 lbs./hr. of ferric chloride were obtained from this operation.

The resulting gaseous products were conveyed through water-cooled ducts to an associated spray condenser of the type shown in U.S. 2,446,181, provided with a cylindrical disc member rotating therein at 6,000 r.p.m. and a conical bottom inclined 30° from the perpendicular. The gases were fed to the condenser while at 400° C. through a plurality of inlet ports. 15,387 lbs./hr. of $TiCl_4$ at 68° C. containing 10.5% suspended iron chloride, were introduced into the condenser and directly impinged on the surface of the high speed rotating disc member and were thereupon converted into a fine spray. Dry, powdered ferric chloride which settled out from this operation collected in the bottom of the condenser in an amount averaging 1411 lbs./hr. and was periodically removed therefrom.

Metal chloride gases leaving the condenser, at 170° C. and containing an average of 98% by weight $TiCl_4$ and 2% by weight $FeCl_3$ were immediately introduced into a conventional cyclone separator externally heated to maintain its walls at 160° C. to 180° C. 1500 lbs./hr. of dry $FeCl_3$, substantially free from $TiCl_4$, were separated in this cyclone. The gases discharging from the cyclone were conveyed to a conventional type surface condenser in which condensation of 70% of the $TiCl_4$ and 100% of the $FeCl_3$ remaining therein was brought about by cooling said gases to 120° C. This amounted to a yield of over 580 lbs./hr. of purified vapor which was passed into an associated secondary refrigerated condenser from which a yield of substantially pure $TiCl_4$ at 27° C. was recovered.

The cyclone discharge $TiCl_4$-$FeCl_3$ slurry at 120° C. was collected in an associated slurry reservoir tank and pumped through the tube side of a four pass water cooled heat exchanger containing 1200 sq. ft. of heat transfer surface. A liquid pumping rate, maintained at a linear velocity of 7 to 8 feet per second was utilized in this step. No fouling or plugging of tubes with $FeCl_3$ slurry solids occurred after 97 days of this operation, and the effective heat transfer at the surface was 98%. The liquid temperature dropped from a range of 116° C.–120° C. to a range of 65–68° C. as a result of this heat exchange treatment, and the cooled $TiCl_4$ product was recycled for spraying countercurrent to the gases being fed to the spray condenser in the initial stage of the operation of this example. Thus, although the $TiCl_4$ liquid contained some $CO_2$, some CO, nitrogen, chlorine and entrained solids, including ferric chloride, the spray condenser was operated for extended periods of time without fouling or stoppage due to solids deposition. In a comparable operation but in which liquid pumping rates of 4 feet per second were resorted to, shut-down for cleaning was required after 3 days' use and necessitated employment of an alternate exchanger during such cleaning.

*Example 2*

In processing hot chlorination gases of the type described in Example 1, the spray condenser discharge containing ferric chloride and other miscellaneous chlorides accumulated over a period of time, results in substantial amounts of ferric chloride contaminated titanium tetrachloride by-products. By diluting the 85% ferric chloride $TiCl_4$ slurry to 42% with $TiCl_4$ containing 5% $FeCl_3$ and solids, heating of the cold slurry can be undertaken as follows: Crude liquid $TiCl_4$ slurry containing approximately 45% by weight solids consisting of ferric chloride, blowover coke, and ore, and miscellaneous chlorides, was pumped through the tube side of a conventional type five-pass heat exchanger having 2,372 sq. ft. of heat transfer surface. The liquid pumping rate was 775 gallons per minute which maintained a linear velocity of about 9 ft./sec. over said surface and prevented fouling of the tubes with the slurry solids. The liquid temperature was taken from 30° C. to 140° C. under a pressure of 3.5 lbs./sq. in. The heated $TiCl_4$ slurry obtained was then pumped into the spray chamber of a conventional type spray drier or atomizer drier operating at atmospheric pressure. The spray drier gases were cooled to 138° C. and passed though an electrostatic separator wherein the major portion of condensed solids, essentially only ferric chloride was collected. The $TiCl_4$ vapor was then passed into a condenser of the type described in Example 1 wherein total condensation of the $TiCl_4$ for further distillation and re-use was brought about. This operation proceeded for an extended (95 day) period without interruption due to fouling of the heat transfer surfaces of the exchanger. Thereafter, heat transfer surface examination revealed, as in the case of Example 1, that the surface remained clean throughout the operation and retained an effective (approximately 95%) heat transfer of the original.

In a comparable operation conducted in the same heat transfer units but at lower (1 ft./sec.) velocity through the tube, complete plugging of the tubes and apparatus shut-down took place after 30 days' operation. When use of a four feet per second velocity was resorted to in an alternative operation, heat transfer through the tubes was found to be approximately 50% after one month's use.

As demonstrated above, this invention provides a unique method for removing heat from slurries of titanium tetrachloride containing ferric chloride and other indigenous solids. It also offers the advantages of increased efficiency and ease of handling iron chloride-containing $TiCl_4$ slurries in that the heat is removed by cooling a liquid rather than a gas or gas-containing solids and non-condensables. In addition, by varying the linear velocity through conduits, close temperature control is maintained and heat transfer surfaces can be relied on to give the calculated design performance.

The invention is applicable to the cooling or heating of titanium tetrachloride liquids in any type heat exchange equipment in which liquid titanium tetrachloride comes in contact with heat transfer surfaces, and permits the continued extended operation of the cooling equipment with no apparatus shut-down for washing the heat exchange tubes or recourse to alternate equipment during cleanout. While the examples demonstrate the applicability of the invention to products resulting from the chlorination of ilmenite, the invention is not limited to such chlorination products in the preparation of titanium tetrachloride. The invention applies to any $TiCl_4$ gas containing ferrous and ferric chlorides, irrespective of whether such gases result from the chlorination of ilmenite, rutile, beneficiated ilmenite, $TiO_2$ containing slags or various ferrotitaniferous materials.

We claim:

1. A method for preventing solid chloride deposition on and the fouling of heat transfer equipment surfaces employed in the treatment of a liquid titanium tetrachloride slurry containing said solid chloride which comprises effecting passage of said slurry over said surfaces while maintaining a lineal velocity on said slurry of at least 5 feet per second.

2. A method for preventing solid chloride deposition on and the fouling of heat transfer equipment surfaces employed in the treatment of a liquid titanium tetrachloride slurry containing said solid chloride which comprises effecting passage of said slurry over said surfaces while maintaining a lineal velocity on said slurry of at least 7 feet per second.

3. A method for cooling a liquid titanium tetrachloride slurry containing up to 10% solid ferric chloride while minimizing ferric chloride deposition on and fouling of the heat transfer surfaces of equipment employed in said cooling which comprises maintaining a lineal velocity flow of said slurry over said surface ranging from 5 feet per second to 60 feet per second.

4. A method for cooling a liquid titanium tetrachloride slurry containing up to 10% solid ferric chloride while minimizing ferric chloride deposition on and fouling of the heat transfer surfaces of equipment employed in said cooling which comprises maintaining a lineal velocity flow of said slurry over said surface ranging from 7 feet per second to 30 feet per second.

5. A method for cooling a liquid titanium tetrachloride slurry containing up to 10% solid ferric chloride while minimizing ferric chloride deposition on and fouling of the heat transfer surfaces of equipment employed in said cooling which comprises maintaining a lineal velocity flow of said slurry over said surface ranging from 7–8 feet per second.

References Cited by the Examiner

UNITED STATES PATENTS 2,619,453  11/1952  Andersen _____ 202—75
2,718,279  9/1955  Kraus _____ 23—87 X

OTHER REFERENCES

Proceedings, Symposium on Saline Water Conversion, 1957, "Research and Development on Scale Prevention in the United States," 7 pp., 44–50.

Saline Water Conversion, Annual Report of the Secretary of the Interior for 1955, "Forced-Circulation and Dropwise Condensation," 2 pp., 12 and 13.

(Other references on following page)

References Cited by the Applicant

UNITED STATES PATENTS

| | | |
|---|---|---|
| 2,184,887 | 12/1939 | Muskat et al. |
| 2,446,181 | 8/1948 | Kraus. |
| 2,668,424 | 2/1954 | Mueller. |
| 2,675,889 | 4/1954 | Frey. |
| 2,675,890 | 4/1954 | Frey et al. |
| 2,675,891 | 4/1954 | Frey. |
| 2,701,179 | 2/1955 | McKinney. |
| 2,701,180 | 2/1955 | Krchma. |
| 2,870,869 | 1/1959 | Mahler. |

ROBERT A. O'LEARY, *Primary Examiner.*

N. R. WILSON, *Assistant Examiner.*